June 10, 1952 E. JAHODA Re. 23,510
METHOD OF MAKING PHOTOGRAPHIC PAPER
Original Filed April 18, 1945
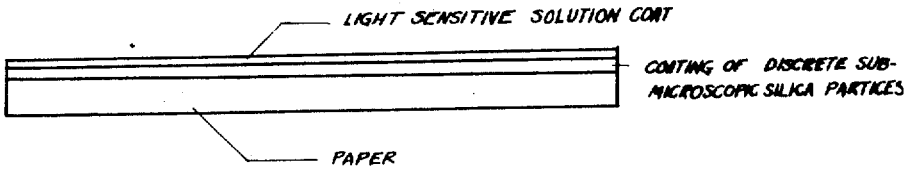
INVENTOR.
Edward Jahoda
BY
Daniel G. Culkin
Attorney Reissued June 10, 1952 Re. 23,510

UNITED STATES PATENT OFFICE 23,510

METHOD OF MAKING PHOTOGRAPHIC PAPER

Edward Jahoda, Manhasset, N. Y., assignor to H. P. Andrews Paper Company, New York, N. Y., a corporation of New York Original No. 2,433,515, dated December 30, 1947, Serial No. 589,102, April 18, 1945. Application for reissue August 10, 1950, Serial No. 178,830

3 Claims. (Cl. 117—34)

Matter enclosed in heavy brackets [ ] appears in the original patent but forms no part of this reissue specification; matter printed in italics indicates the additions made by reissue.

This application relates to improvements in photosensitive paper used in the well-known processes of making prints, such as blue prints, Vandyke prints, diazotype prints, photographs, etc.

The invention will be described with particular reference to the ordinary process of blue printing, where white image lines are shown against a blue brackground, and where papers, coated with a light sensitive coating, precipitated from iron salt solutions, are used for the prints. Such papers are exposed to light under a design, washed to remove chemicals not affected by light, as where hidden by lines of the original, developed in a suitable developing solution, such as potassium dichromate, rinsed and dried. The resulting blueprints are negatives of the original, having white lines against a blue background.

For years, the blueprint industry has tried to increase the intensity of the print so as to get a more intense blue, and a greater contrast between the blue background and the white lines of the print. Some have attempted to solve this problem by changing the light sensitive emulsions or solutions used in blueprinting, which, in the ordinary process, comprise solutions of light sensitive iron salt compounds. Others have attempted to improve the paper base. Still others have attempted to improve the method of applying the light sensitive coating.

I approach the problem quite differently. I approach the problem by improving the surface of the paper base before the light sensitive coating is applied, and this I do by pre-coating the paper base before applying the light sensitive coating. Thus, I am not presently concerned with improvements in the specific light sensitive coatings employed, nor in the methods of applying these coatings, nor in the paper base.

Very often paper is sized to make it more or less impervious to water solutions, and my pre-coating is not to be confused with sizing. Most often my pre-coating is applied to paper which has previously been sized in any conventional manner. *My pre-coating is applied to photosensitive paper such as blue print, Vandyke print, diazotype print and photographic paper to which size has been previously applied in any conventional manner.*

My pre-coating consists of a layer of discrete sub-microscopic particles of silica such as might be formed by a precipitate of a colloidal water dispersion, precipitated on the surface of the paper. One that I have used successfully for this purpose is known as silica sol. The silica sol that I have used successfully has a solid content of 20% and is sold by the Monsanto Chemical Co., Merrimac Division, Everett, Mass., to the textile trade under the trade name of Syton-W-20.

The pre-coating silica sol dispersion may be applied to the paper surface in any convenient manner, by brush coating, roller coating, spraying, etc. By evaporation of the water solvent, as by heat drying, the silica is precipitated onto the paper to form the pre-coating of my invention. The pre-coating adheres very firmly to the paper.

Paper thus pre-coated may thereafter be coated with any desirable light sensitive solution, and will be found superior for photographic use than papers now known.

I believe that the pre-coating that I have here described actually precoats the fibers of the paper surface and thus enables these fibers to have a greater retention for the light sensitive solution or coating later applied to the paper.

Paper pre-coated according to my invention, and then prepared in the usual manner for blueprinting, as by applying thereto a light sensitive coating, and especially when used in the ordinary blueprint process, where white lines are produced against a blue background on the finished blueprint, is far superior to paper now known which are not pre-coated according to my invention. In blueprinting, different printing results are obtained from different speeds of the paper through the printing machine. There is a range of speeds, minimum and maximum, below and above which satisfactory results are not obtainable. That range is far smaller or narrower for presently known, non-pre-coated papers, than for papers pre-coated according to my invention. This means that a greater range of originals may be blueprinted satisfactorily at a single speed, when my pre-coated paper is used, than when presently known papers are used.

In addition, better reproduction results can be obtained by paper pre-coated according to my invention, particularly where the original to be reproduced offers insufficient contrast, as in cases where faint lines form part of the original image.

In addition, the blue of the background of blueprints prepared from paper pre-coated according to my invention is far more intense than is the case where presently known papers are used.

It has been found that coating the papers with the light sensitive solutions or coatings is considerably facilitated when the paper is pre-coated according to my invention. Pre-coated papers can be run through the light sensitive coating machine at higher speeds than non-pre-coated papers. In addition, pre-coated papers require no special wetting agents that are sometimes necessary in the application of blueprint coatings to non-pre-coated papers.

A possible explanation for the improvement effected by the pre-coating herein described is this: it is believed that it is the pattern and number of pores that control the absorption of the sensitive solution. The pre-coating has a tendency to create on the surface of the paper an artificial surface, having a multitude of pores of colloidal size, which covers the paper surface completely. With paper pre-coated according to my invention, the pores are created by the multitude of silica particles which are inert, very strong, and arranged in a much more regular geometrical patern than are offered by the pores of the paper. The pre-coat may operate as an ultrafilter when the light sensitive coating is applied, holding back colloidal solutions. Subsequently, when the paper is used in photography and the photographic precipitates are formed thereon, as by the exposure of light, or by the use of development solutions, the silica particles, arranged in regular pattern, may serve as nuclei for the precipitation, enhancing the possibility of precipitation of larger amounts of the precipitates and larger particles of the precipitates.

This explanation is offered without intent, however, to be bound by it; it represents my best thought on the subject at the present moment.

The appended drawing shows a paper treated according to my invention.

Now having described my invention, reference should be had to the claims which follow:

1. In the preparation of a *photosensitive* paper base material, the step of applying a penetration-restricting sizing to the paper, followed by the step of precipitating a silica coating from a colloidal liquid dispersion of silica onto the surface of the paper, the silica in said precipitate consisting of discrete particles of colloidal size.

2. In the preparation of a *photosensitive* paper base material, the step of applying a penetration-restricting sizing to the paper, followed by the step of precipitating a silica coating from a colloidal water dispersion of silica onto the surface of the paper, the silica in said precipitate consisting of discrete particles of colloidal size.

3. The method of preparing a light-sensitive print sheet, which comprises applying to the surface of a paper sheet having a penetration-restricting sizing thereon, a colloidal liquid dispersion of silica, removing the liquid vehicle from the dispersion, whereby the resultant silica deposit on the sized surface consists of discrete particles of colloidal size, applying a light-sensitive coating in initially flowing condition directly onto said deposited silica, and allowing said light-sensitive coating to solidify.

EDWARD JAHODA.

REFERENCES CITED

The following references are of record in the file of this patent and the original patent:

UNITED STATES PATENTS

| Number | Name | Date |
|---|---|---|
| 1,230,095 | Baum | June 19, 1917 |
| 1,989,879 | Murck | Feb. 5, 1935 |
| 2,121,205 | Lippert et al. | June 21, 1938 |
| 2,244,325 | Bird | June 3, 1941 |
| 2,348,686 | Van Epps | May 9, 1944 |
| 2,408,654 | Kirk | Oct. 1, 1946 |
| 2,443,512 | Powers | June 15, 1948 |

FOREIGN PATENTS

| Number | Country | Date |
|---|---|---|
| 6,857 | Great Britain | 1914 |

OTHER REFERENCES

Silicate of Soda in Papermaking, Phila. Quartz Co., 1921.